United States Patent
Kosiba et al.

(10) Patent No.: US 10,523,040 B2
(45) Date of Patent: Dec. 31, 2019

(54) METHOD AND APPARATUS FOR CHARGING MULTIPLE ELECTRICAL DEVICES

(71) Applicant: MOTOROLA SOLUTIONS, INC., Chicago, IL (US)

(72) Inventors: David W. Kosiba, Hoschton, GA (US); Scott H. Richards, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 16 days.

(21) Appl. No.: 15/875,945

(22) Filed: Jan. 19, 2018

(65) Prior Publication Data

US 2019/0229549 A1    Jul. 25, 2019

(51) Int. Cl.
*H02J 7/00* (2006.01)
*H02J 7/02* (2016.01)
*H02J 50/90* (2016.01)
*H02J 50/10* (2016.01)

(52) U.S. Cl.
CPC ............ *H02J 7/025* (2013.01); *H02J 7/0021* (2013.01); *H02J 7/0044* (2013.01); *H02J 50/10* (2016.02); *H02J 50/90* (2016.02)

(58) Field of Classification Search
CPC ........ H02J 7/025; H01F 38/14; Y02T 90/122; B60L 11/182; Y02E 60/12
USPC ......................................................... 320/108
See application file for complete search history.

(56) References Cited

U.S. PATENT DOCUMENTS

| 6,278,210 | B1 | 8/2001 | Fatula, Jr. et al. |
| 7,772,802 | B2 | 8/2010 | Manico et al. |
| 8,169,185 | B2 | 5/2012 | Partovi et al. |
| 9,300,162 | B2 | 3/2016 | Lai et al. |
| 9,649,948 | B2 | 5/2017 | Bell et al. |
| 2009/0153098 | A1 | 6/2009 | Toya et al. |
| 2012/0326659 | A1 | 12/2012 | Shukuya |
| 2016/0172870 | A1* | 6/2016 | Blum .............. H02J 5/005 320/108 |
| 2017/0104352 | A1 | 4/2017 | Stratton et al. |
| 2019/0070968 | A1* | 3/2019 | Fukubayashi ........ B60L 50/50 |

OTHER PUBLICATIONS

PCT/US2019/013828 International Search Report and Written Opinion of the International Searching Authority dated Mar. 8, 2019 (14 pages).

* cited by examiner

*Primary Examiner* — Arun C Williams
(74) *Attorney, Agent, or Firm* — Michael Best & Friedrich LLP (57) ABSTRACT

A charger and method for charging multiple electrical devices. The charger includes a platform including a charging section. The platform is configured to receive a plurality of electrical devices and move relative to a center member. The charger further includes a charging coil configured to charge an electrical device of the plurality of electrical devices when the electrical device is positioned within the charging section. The charger is configured to determine a charge level of the electrical device when the electrical device is positioned within the charging section, determines when the charge level of the electrical device exceeds a predetermined charge threshold, and position, when the charge level of the electrical device exceeds the predetermined charge threshold, at least one other electrical device within the charging section and move the electrical device out of the charging section.

18 Claims, 4 Drawing Sheets

METHOD AND APPARATUS FOR CHARGING MULTIPLE ELECTRICAL DEVICES

BACKGROUND OF THE INVENTION

Battery-powered, portable electronic devices (which are, more generally, electrical devices) are used for a variety of purposes. For example, public safety personnel (police officers, fire fighters, paramedics or other first responders) may use communication devices, recording devices, and other battery-powered portable electronic devices that are useful to them during the performance of their duties. In another example, people engaging in hiking, mountain or rock climbing, hunting, or similar outdoor recreational activities may use a battery-powered portable electronic device (for example, a navigation device) to enhance their recreational experience.

Wireless power transfer systems have been implemented to recharge the batteries of such devices. Wireless power transfer systems transfer electrical power, without wired connections, using, for example, inductive or resonant magnetic coupling.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Wireless charging affords users a simple, effective method of charging battery-powered, portable electronic devices. Hereafter, the more general term "electrical devices" is used to refer to these and other devices.

In the case of multiple device charging, a simple, compact charger is desirable. In addition, information regarding a charge status of the electrical devices made readily available is necessary to allow users to quickly determine whether a device or battery is sufficiently charged to use. Accordingly, embodiments described herein provide, among other things, a charger and method of charging multiple electrical devices.

One example embodiment provides a charger for charging multiple electrical devices. The charger includes a first platform, a first charging coil, and an electronic processor. The first platform includes a charging section and is configured to receive a plurality of electrical devices and to move relative to a center member. The first charging coil is positioned at or within the center member and configured to charge an electrical device of the plurality of electrical devices when the electrical device is positioned within the charging section. The electronic processor is configured to determine a charge level of the electrical device when the electrical device is positioned within the charging section, determine when the charge level of the electrical device exceeds a predetermined charge threshold, and position, when the charge level of the electrical device exceeds the predetermined charge threshold, at least one other electrical device of the plurality of electrical devices within the charging section and move the electrical device out of the charging section by moving the first platform relative to the center member.

Another example embodiment provides a method of charging multiple electrical devices. The method includes determining a charge level of an electrical device of a plurality of electrical devices when the electrical device is positioned within a charging section of a first platform configured to receive the plurality of electrical devices and to move relative to a center member, the center member including a first charging coil positioned at or within the center member, the first charging coil configured to charge the electrical device of the plurality of electrical devices when the electrical device is positioned within the charging section. The method also includes determining when the charge level of the electrical device exceeds a predetermined charge threshold when the electrical device is positioned within the charging section and positioning, when the charge level of the electrical device exceeds the predetermined charge threshold, at least one other electrical device of the plurality of electrical devices within the charging section and move the electrical device out of the charging section by moving the first platform relative to the center member.

Another example embodiment provides a charger including a housing and at least one moveable platform. The housing includes a wireless charging coil configured to wirelessly charge an electrical device when the electrical device is positioned within a range of the wireless charging coil. The at least one moveable platform is coupled to the housing. The at least one moveable platform is configured to receive a plurality of electrical devices to be charged and to move at least one of the plurality of electrical devices within the range of the wireless charging coil for wirelessly charging the at least one of the plurality of electrical devices when a charge level of the at least one of the plurality of electrical devices exceeds a predetermined charge threshold.

For ease of description, some or all of the example systems presented herein are illustrated with a single example of each of its component parts. Some examples may not describe or illustrate all components of the systems. Other example embodiments may include more or fewer of each of the illustrated components, may combine some components, or may include additional or alternative components.

The term "wireless power transfer," as used herein, refers to the wireless transfer of electrical power by the inductive or resonant coupling of two or more coils. Coils so coupled are sometimes referred to herein as being magnetically coupled. Wireless power transfer using resonant coupling includes operating the coils at a resonant frequency, which is the same for both coils. A wireless power transfer device (for example, a battery charger) may be used to recharge the batteries of an electrical device. In certain types of wireless power transfer devices a transmit coil is energized at an operating frequency, producing an oscillating magnetic field. The battery or electrical device, containing a receive coil designed for the same operating frequency is placed in proximity to the transmit coil. The oscillating magnetic field induces an electric current in the receive coil, which is used to power battery charging circuits. When the transmit and receive coils are substantially aligned, efficient wireless power transfer can occur.

Figure 1A:
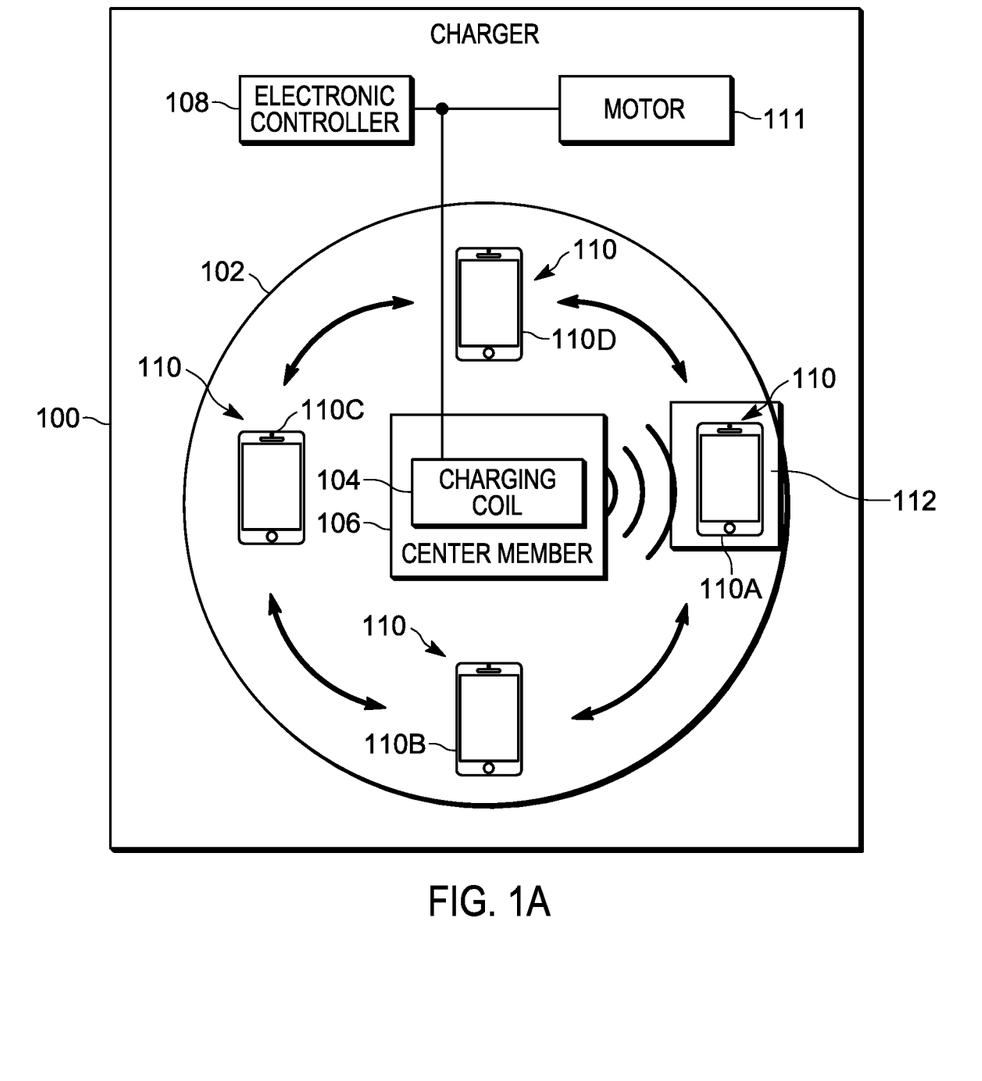
FIG. 1A is an illustration of a charger for charging a plurality of electronic devices in accordance with some embodiments.
Figure 1B:
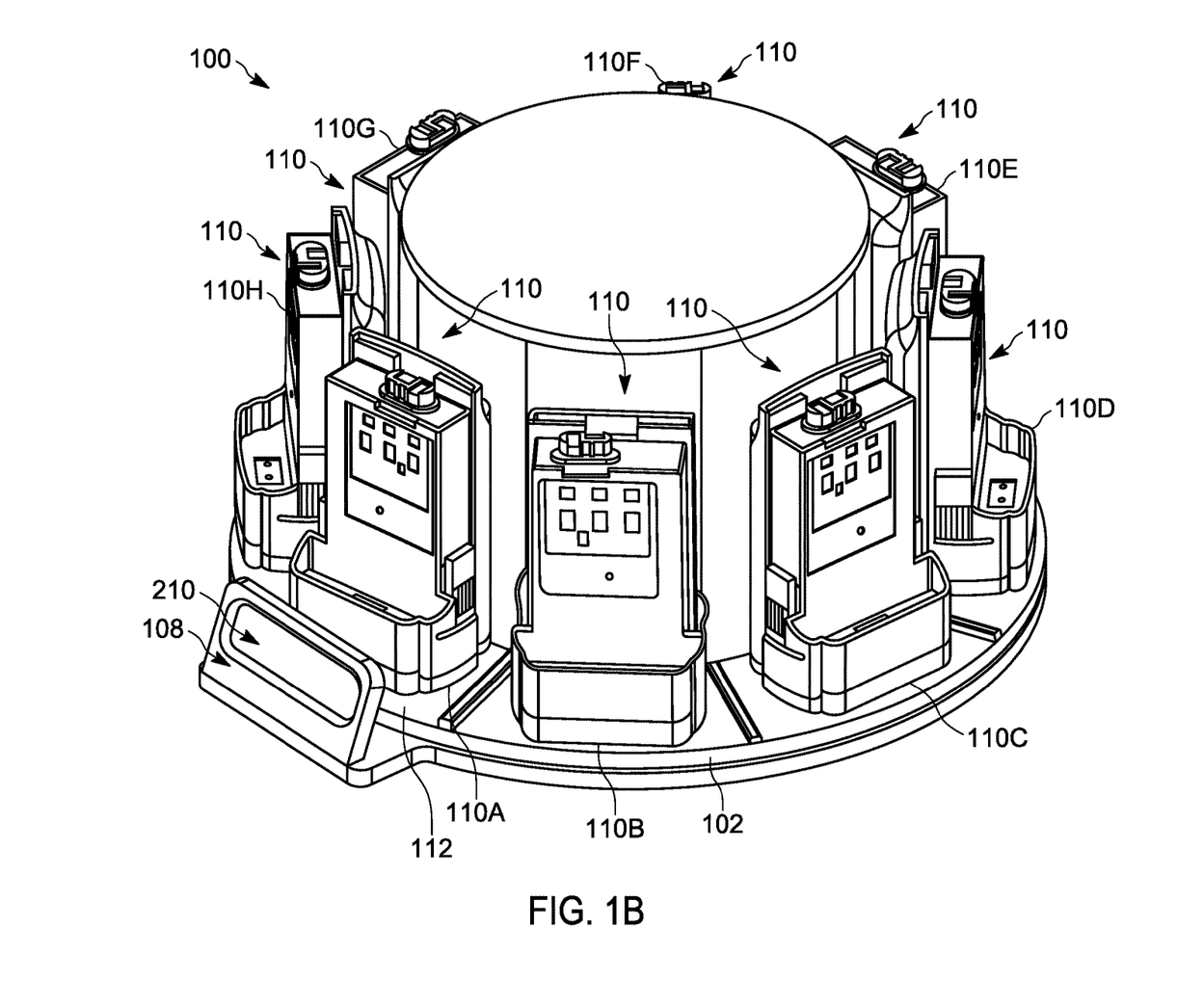
FIG. 1B illustrates an example configuration of the charger of FIG. 1A in accordance with some embodiments.

FIGS. 1A and 1B illustrates a charger 100 for charging multiple electrical devices in accordance with some embodiments. In the example illustrated, the charger 100 includes a platform 102, a charging coil 104, a center member 106, and an electronic controller 108. The platform 102 is configured to receive one or more of a plurality of electrical devices 110. The platform 102 is also configured to move relative to the center member 106. In the embodiment illustrated, the platform 102 moves (or is driven by) according to a force exerted on the platform 102 causing the platform 102 to move relative to the center member 106. For example, the platform 102 may be driven by a motor 111 (or, in some embodiments, an actuator) controlled by the electronic controller 108. In some embodiments, the platform 102 is configured to rotate about the center member 106. In further embodiments, the platform 102 is configured to move tangential to (or slide along) the center member 106.

The charging coil 104 is part of a resonant coupling system for wireless power transfer for charging one or more of the electrical devices 110. As can be appreciated by one skilled in the art, resonant coupling systems may include more than one coil on the transmitter side and more than one coil on the receiver side. For ease of description, the charging coil 104 is described herein in terms of a single coil on the transmitter side (at/within the charger 100) and a single coil (not shown) on the receiver side (at/within each of the electrical devices 110). In one example, the charging coil 104 is a flat-wound multiple turn coil with a generally planar form. The charging coil 104 may be, for example, circular, rectangular, or square in shape. In some embodiments, the coil 104 may also be used for near-field wireless communication.

The charging coil 104 may be positioned at or within the center member 106. When energized (as controlled, for example, by the electronic controller 108) the charging coil 104 creates an electromagnetic field. The electromagnetic field exists within an effective range/distance. The platform 102 includes a charging section 112 positioned within the electromagnetic field of the charging coil 104 such that the coil 104, when energized, charges an electrical device (for example, an electrical device 110A of the plurality of electrical devices 110) when the electrical device is positioned within the charging section 112.

Figure 4:
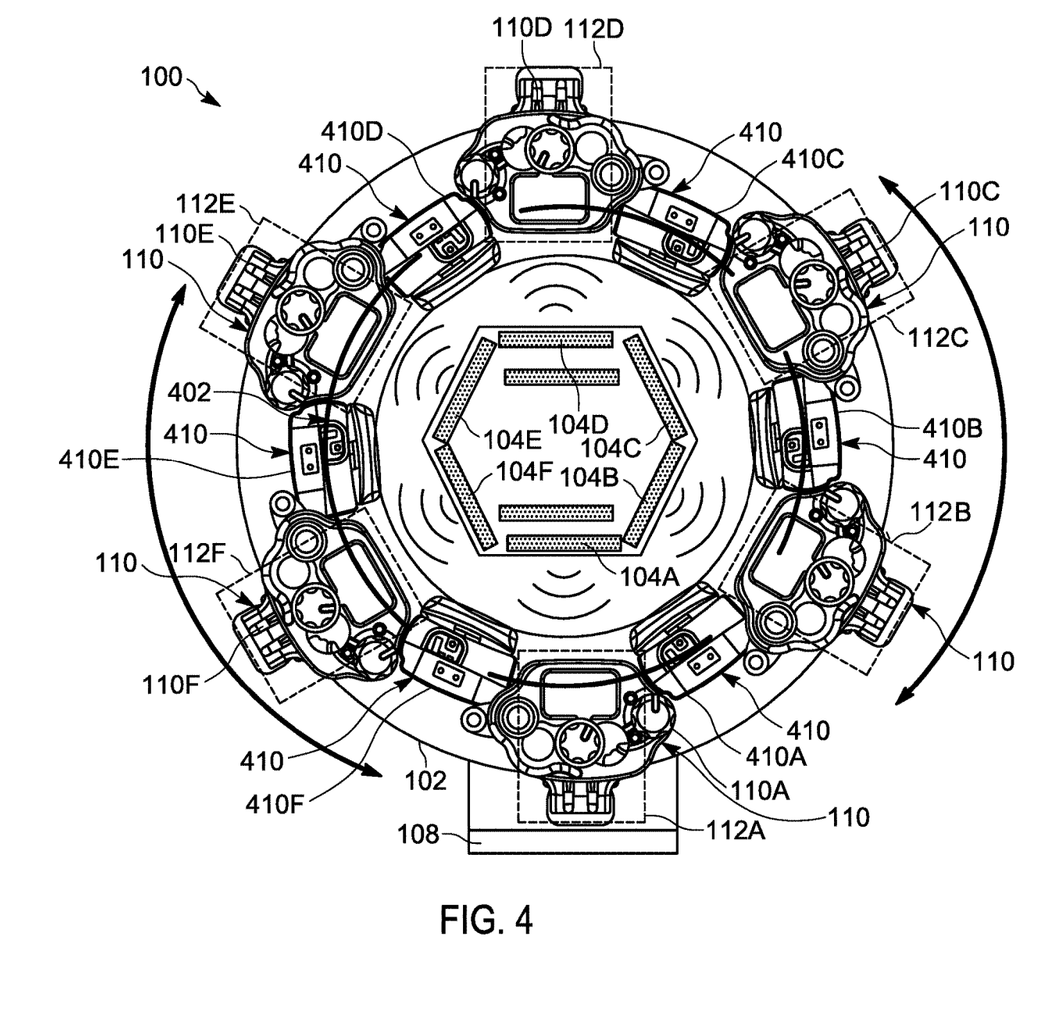
FIG. 4 illustrates an exposed view of an example configuration of the charger of FIG. 1A in accordance with some embodiments.

In some embodiments, as described in more detail below in regard to FIG. 4, the platform 102 includes more than one charging section 112. In such embodiments, one or more of the charging sections may be positioned within the electromagnetic field of the same charging coil. For example, the charging coil 104 may include two or more charging sections within the electromagnetic field of the coil 104. In some embodiments, as described in more detail below in regard to FIG. 4, the platform 102 includes more than one charging coil.

The plurality of electrical devices 110 includes electrical devices 110A to 110D. It should be understood however that the plurality of electrical devices 110 may include any number of electrical devices. For example, in FIG. 1B the plurality of electrical devices 110 includes a total of eight electrical devices 110A-110H, including the four electrical devices 110A-110D illustrated in FIG. 1A. In FIG. 4, the plurality of electrical devices 110 includes six electrical devices 110A-110F.

Each of the electrical devices 110 may be a portable electronic device configured to receive wireless charge. A portable electronic device may be, for example, a smart phone, portable radio, tablet, laptop, and the like. In some embodiments, the electrical devices received by the charger 100 may be a combination of at least two different types of portable electronic devices.

FIG. 1B illustrates an example configuration of the charger 100 according to some embodiments. In the illustrated embodiment, the platform 102 is configured to rotate relative to the center member 106. As described in detail below in regard to FIG. 2, in some embodiments the electronic controller 108 further includes a display 210.

Figure 2:
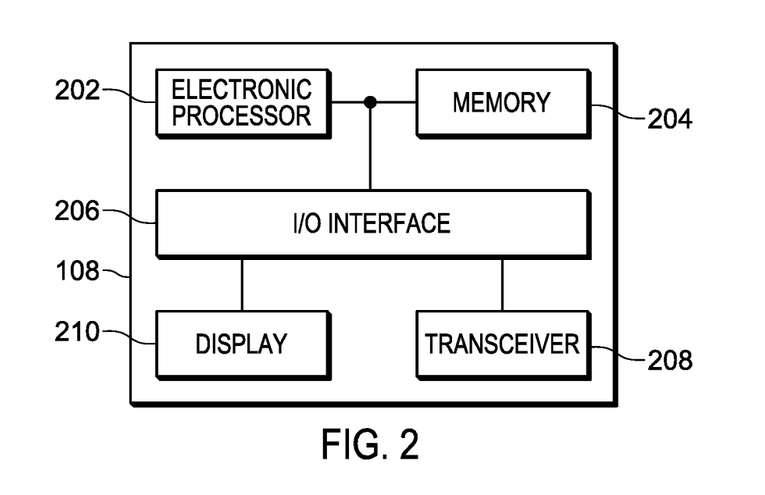
FIG. 2 is a diagram of an electronic controller of the charger of FIG. 1 in accordance with some embodiments

FIG. 2 is a block diagram of the electronic controller 108. The electronic controller 108 includes an electronic processor 202, a memory 204, an input and output (I/O) interface 206, and a transceiver 208. In some embodiments, the I/O interface 206 includes the display 210. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein. The electronic controller 108 is presented as an example that may be programmed and configured to carry out the functions described herein.

In some embodiments, components of the electronic controller 108 may be separately implemented, and may be communicatively coupled by a bus or by a suitable communication network. For example, the electronic controller 108 may include a network-connected portable computer or similar device in proximity to the charger 100. Similarly, the display 210 may be part of another device outside the electronic controller 108. It should be understood that, in other constructions, the electronic controller 108 includes additional, fewer, or different components than those illustrated in FIG. 2.

The electronic processor 202 obtains and provides information (for example, from the memory 204, the transceiver 208, the display 210 and/or the devices coupled to the I/O interface 206 and of the charger 100 including the motor 111) and processes the information by executing one or more software instructions or modules, capable of being stored, for example, in a random access memory ("RAM") area of the memory 204, a read only memory ("ROM") of the memory 204, or another non-transitory computer readable medium (not shown). The software can include firmware, one or more applications, program data, filters, rules, one or more program modules, and other executable instructions. The electronic processor 202 is configured to retrieve from the memory 204 and execute, among other things, software related to the control processes and methods described herein.

The memory 204 can include one or more non-transitory computer-readable media, and includes a program storage area and a data storage area. The program storage area and the data storage area can include combinations of different types of memory, as described herein. The memory 204 may take the form of any non-transitory computer-readable medium. In the embodiment illustrated, the memory 204 stores, among other things, instructions for charging multiple devices of the charger 100 as described below in regard to FIG. 3.

The I/O interface 206 operates to receive input from, for example, a user of the charger 100, to provide system output, or a combination of both. The I/O interface 206 obtains information and signals from, and provides information and signals to, (for example, over one or more wired and/or wireless connections) devices both within and outside the electronic computing system. Input may be provided via, for example, a keypad, additional microphones, soft keys, icons, soft buttons, a scroll ball, buttons, and the like. System output may be provided via a visual and/or audio output (for example, the display 210). The display 210 may be a suitable display device such as, for example, a liquid crystal display (LCD) touch screen, or an organic light-emitting diode (OLED) touch screen. The I/O interface 206 may include a graphical user interface (GUI) (for example, generated by the electronic processor 202, from instructions and data stored in the memory 204, and presented on the display 210) that enables a user to interact with the charger 100. In some embodiments, the display 210 of the charger 100 may be separate from the charger 100. For example, the display 210 may be the display of a remote device of a user (for example, a smart phone or a portable computer). In such embodiments, the electronic processor 202 may be configured to transmit information regarding the plurality of electrical devices 110 to the remote device to display on the display 210, as described in more detail below in regard to FIG. 3. In some embodiments, the display of the remote device may be utilized in addition to the display 210 of the charger 100.

The transceiver 208 is configured for wireless coupling to wireless networks (for example, land mobile radio (LMR) networks, Long Term Evolution (LTE) networks, Global System for Mobile Communications (or Groupe Special Mobile (GSM)) networks, Code Division Multiple Access (CDMA) networks, Evolution-Data Optimized (EV-DO) networks, Enhanced Data Rates for GSM Evolution (EDGE) networks, 3G networks, 4G networks, combinations or derivatives thereof, and other suitable networks, including future-developed networks. Alternatively, or in addition, the electronic controller 108 may include a connector or port (not shown) for receiving a connection to a wired network (for example, Ethernet). The electronic processor 202 is configured to operate the transceiver 208 to receive input from and to provide system output, or a combination of both. The transceiver 208 obtains information and signals from, and provides information and signals to, (for example, over one or more wired and/or wireless connections) devices both internal and external to the charger 100. In some embodiments, the transceiver 208 may be integrated within the coil 104 to perform short range (near-field) communication with one or more of the plurality of devices 110 (for example, when one of the plurality of electrical devices 110 is positioned within the charging section 112).

Figure 3:
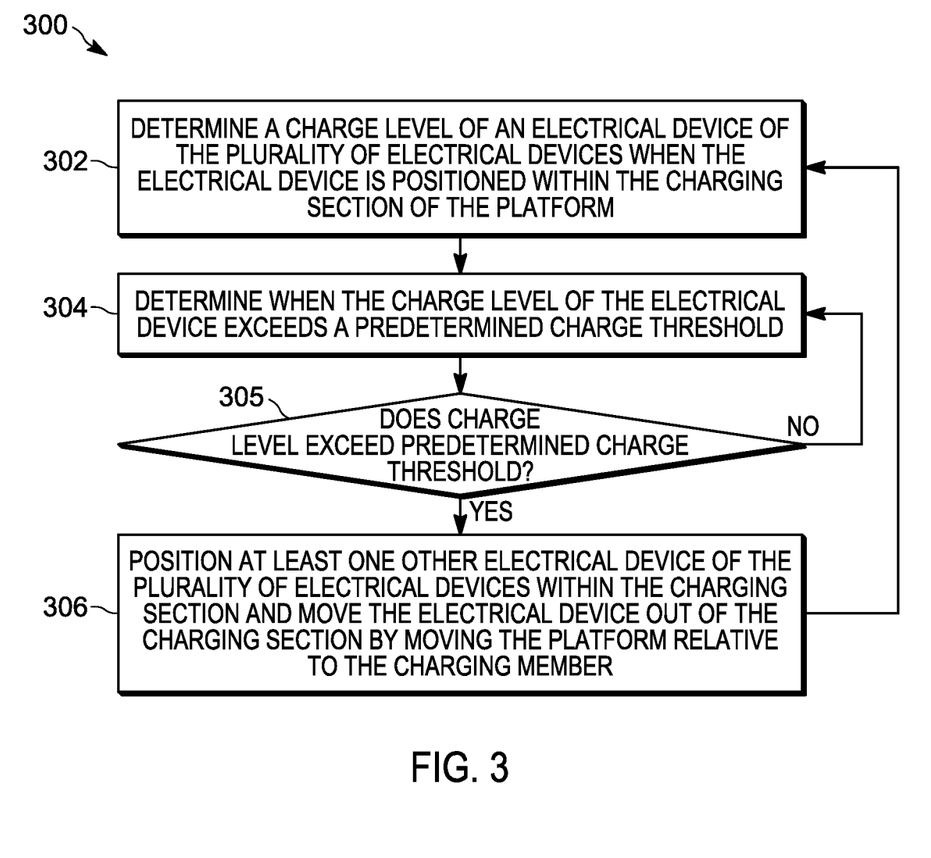
FIG. 3 is a flowchart illustrating a method of charging multiple electrical devices implemented by the charger of FIG. 1 according to some embodiments.

FIG. 3 illustrates a method 300 of charging multiple electrical devices performed by the charger 100. As an example, the method 300 is described as being performed by the electronic processor 202 of the electronic controller 108 and in terms of the components of the charger 100 illustrated in FIG. 1 described above.

At block 302, the electronic processor 202 determines a charge level of an electrical device 110A of the plurality of electrical devices 110 when the electrical device 110A is positioned within the charging section 112 of the platform 102. The charge level may be the level of charge of a battery (not shown) of the electrical device 110A. In some embodiments, the electronic processor 202 determines the charge level by requesting information regarding the charge from the electrical device 110A.

At block 304, the electronic processor 202 determines when the charge level of the electrical device 110A exceeds a predetermined charge threshold. The predetermined charge threshold may be a numeric value or a defined percentage of charge the electrical device 110A is configured to store when fully or completely charged. In some embodiments, the predetermined charge threshold is a default value or percentage. In further embodiments, the predetermined charge threshold is defined by a user of the charger via the user interface of the electronic controller 108. In further embodiments, the predetermined charge threshold is specific to each of the plurality of electrical devices 110 (specifically, the predetermined charge threshold may be different between each of the plurality of electrical devices 110.) In some embodiments, the electronic controller 108 is configured to display, on the display 210, information based on the charge level of at least one electrical device (for example, the electrical device 110A) when positioned within the charging section 112.

When the electronic processor 202 determines that the charge level of the electrical device 110a within the charging section 112 is below the predetermined threshold, (block 305) the electronic processor 202 continues charging and measuring the charge level of the device 110A (repeating block 304). At block 306, the electronic processor 202 positions at least one other electrical device of the plurality of electrical devices 110 within the charging section 112 and moves the electrical device 110A out of the charging section 112 by moving the platform 102 relative to the center member 106 when the electronic processor 202 determines that the charge level of the electrical device 110A exceeds the predetermined charge threshold. In other words, the electronic processor 202 controls the motor 111 to move the platform 102 relative to the center member 106 such that at least one other device (for example, a second electrical device 110B) of the plurality of electrical devices 110 is positioned within the charging section 112 while the electrical device 110A is consequently moved out of the charging section 112. The method 300 may then be repeated starting at block 302 with the at least one other device.

In some embodiments, the second electrical device 110B is selected from the plurality of electrical devices 110 based on a location of the second electrical device 110B relative to the electrical device 110A. For example, the second electrical device 110B may be selected from the plurality of electrical devices 110 based on a manual force (for example, from the motor 111) exerted on the platform 102 that causes the platform 102 to move relative to the center member 106. In some embodiments, the second electrical device 110B may be the electrical device of the plurality of electrical devices 110 located directly adjacent (for example, next to) the electrical device 110A. The second electrical device 110B may be selected from the plurality of electrical devices 110 automatically or based on a user input. In some embodiments, the second electrical device 110B is selected from the plurality of electrical devices based on the charge level of the second electrical device 110B compared to the other electrical devices 110. For example, the second electrical device 110B may be the electrical device determined to have the lowest charge level relative/compared to the other electrical devices 110. In some embodiments, the second electrical device 110B is selected from the plurality of electrical devices 110 based on a priority associated with the electrical device 110B. The priority may be based on a role/profile of a user assigned to the electrical device 110B. For example, a higher priority may be associated with an electrical device of the plurality of electrical devices 110 that is assigned to a police sergeant compared to a priority associated with an electrical device assigned to a police officer. When the second electrical device is determined from the plurality of electrical devices 110 (for example, the electrical device with the lowest charge level), the electronic processor 202 moves the platform 102, via the motor 111, until the second electrical device is positioned within the charging section 112.

Although the method 300 describes charging a single electrical device at a time, it should be understood that, in some embodiments, the charger 100 may be configured to charge more than one electrical device of the plurality of electrical devices 110. For example, the charger 100 may be configured to simultaneously charge at least two electrical devices by positioning a first electrical device in a first charging section 112 (for example, the charging section 112A of FIG. 4) and positioning a second electrical device in a second charging section (for example, the charging section 112B of FIG. 4) of the platform 102. Although described in terms of a single second electrical device 110B and a single charging station 112, it should be understood that, in some embodiments, more than one other electrical device may be positioned within the charging section 112 and/or more than one electrical device may be positioned within more than one charging station of the charger 100. It should also be understood that although the method 300 is described in terms of a single charging section 112, in some embodiments, when the charger 100 includes more than one charging section, the some or all of the blocks 302, 304, 305, and 306 of the method 300 may be executed in terms of one or more of the chargers simultaneously and/or interchangeably. For example, at block 304, the electronic processor 202 may determine when the charge level of either electrical devices each positioned in a first and second charging section exceeds the predetermined charge threshold simultaneously while at block 305, it may be the case that the electrical device of the first or second charging section exceeds the predetermined charge threshold while the other electrical device fails to.

As described above in regard to FIG. 1A, the charger 100 may include additional components similar to those illustrated and described above. For example, FIG. 4 illustrates a configuration of the charger 100 of in accordance with some embodiments. FIG. 4 illustrates an embodiment of the charger 100 where the charger 100 includes a second platform 402, wherein the second platform 402 is configured to receive a second plurality of electrical devices 410. The second plurality of electrical devices 410 includes electrical devices 410A to 410F. In some embodiments, the second platform 402 is configured to move relative to the center member 106 similar to the platform 102. For example, in the illustrated embodiment of FIG. 4, the second platform 402 rests on top of/is integrated into the platform 102 (described herein as an "integrated" configuration). The second platform 402 may be structured and include components configured to perform functions similar to those of the platform 102 (described above in regard to FIG. 1.) As previously discussed, in some embodiments, as illustrated in FIG. 4, the first platform 102 may include more than one charging coil and charging section. For example, as illustrated in FIG. 4, the first platform 102 includes charging coils 104A-104F. Each charging coil 104A-104F is configured to charge an electrical device 110A-110F, respectively, of the plurality of electrical devices 110 when the electrical device 110A-110F is positioned within a charging section 112A-112F of the charging coil 104A-104F.

In some embodiments, the platform 102 may include at least a second charging section 112B and a second charging coil 104B positioned at or within the center member 106. The second charging coil 104B is configured to charge at least one other electrical device (for example, an electrical device 110B) when the at least one other electrical device 110B of the plurality of electrical devices 110 is positioned within the second charging section 112B (simultaneously while the electrical device 110A is being charged by the charging coil 104A).

In further embodiments, electronic processor 202 may be further configured to position an electrical device 410A of the second plurality of electrical devices 410 within the charging section 112A and charge the second electrical device 410B using the charging coil 104.

Although the second platform 402 is illustrated as being disposed on top of the platform 102 and move relative to the center member 106, it should be understood that, in some embodiments, the platform 402 is configured to move relative to another center member (not shown) and is separate from the platform 102 (described herein as a "stacked" configuration). For example, the second platform 402 may be configured to rotate about a second center axis than may be stacked on top of and/or mounted to the center member 106. In such embodiments, the second platform 402 may be in communication with a second electronic controller (not shown) configured to communicate with the first electronic controller 108 including information regarding the second plurality of electrical devices 410. The second electronic controller may include less or more components and be configured to perform functions similar to those as described in regard to the electronic controller 108 described above (see FIG. 3). The electronic controller 108 may be further configured to position an electrical device of the second plurality of electrical devices within the second charging station and charge the electrical device of the second plurality of electrical devices using a second charging coil. The second charging coil may be located at or within the second center member.

In either the "integrated" or "stacked" configurations described above, in some embodiments, the electronic controller 108 is configured to position an electrical device of the second plurality of electrical devices within a charging section (for example, the charging section 112A or a charging section of the second platform 402) when each of the plurality of electrical devices 110 exceeds the predetermined charge threshold. In other words, the electrical devices of the second plurality of electrical devices 410 are charged only after the electrical devices of the first plurality 110 each exceed the predetermined charge threshold.

It should be noted that a plurality of hardware and software based devices, as well as a plurality of different structural components may be utilized to implement the invention. In some embodiments, the invention provides a software application that is executable, alternatively to or in addition to the charger 100, on a personal computing device, such as a smart phone, tablet computer, smart watch, a portable radio, a body-worn camera device, and the like. The personal computing device may be one or more of the plurality of devices 110 of the charger 100 or, as described above, a remote device outside of the charger 100. In some embodiments, the software application may be stored and executed by a remote computing device, such as a server. In particular, the software application may be executed by a server, and a user can access and interact with the software application using a remote computing device. Also, in some embodiments, functionality provided by the software application as described above may be distributed between a software application executed by a user's personal portable electronic device (separate from the charger 100) and a software application executed by another electronic process or device (for example, a server) external to the charger 100. For example, a user can execute a software application (for example, a mobile application) installed on his or her smart device, which is configured to communicate with another software application installed on a server.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more electronic processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A charger for charging multiple electrical devices, the charger comprising:
    a platform including a charging section and configured to receive a plurality of electrical devices and to move relative to a center member;
    a first charging coil positioned within the center member, the first charging coil configured to charge an electrical device of the plurality of electrical devices when the electrical device is positioned within the charging section;
    an electronic processor configured to
        determine a charge level of the electrical device when the electrical device is positioned within the charging section;

determine when the charge level of the electrical device exceeds a predetermined charge threshold; and position, when the charge level of the electrical device exceeds the predetermined charge threshold, at least one other electrical device of the plurality of electrical devices within the charging section and move the electrical device out of the charging section by rotating the platform relative to the center member.

2. The charger of claim 1, wherein the at least one other electrical device is selected from the plurality of electrical devices based on whether the at least one other electrical device is located directly adjacent to the electrical device, a charge level of the at least one other electrical device, a user input, and a manual force exerted on the platform causing the platform to move relative to the charging section.

3. The charger of claim 1, the charger further comprising a second platform including a second charging section and configured to move relative to the center member and receive a second plurality of electrical devices.

4. The charger of claim 3, wherein the electronic processor is configured to position an electrical device of the second plurality of electrical devices within the second charging section and charge the electrical device of the second plurality of electrical devices using the first charging coil.

5. The charger of claim 3, wherein the electronic processor is configured to position an electrical device of the second plurality of electrical devices within the second charging section and charge the electrical device of the second plurality of electrical devices using a second charging coil.

6. The charger of claim 3, wherein the electronic processor is configured to position the electrical device of the second plurality of electrical devices within the second charging section when each electrical device of the plurality of electrical devices exceeds the predetermined charge threshold.

7. The charger of claim 1, wherein the platform further includes a second charging section and wherein the charger further includes a second charging coil positioned at or within the center member, the second charging coil configured to charge the at least one other electrical device of the plurality of electrical devices when the at least one other electrical device of the plurality of the electrical devices is positioned within the second charging section.

8. The charger of claim 1 further comprising a display and wherein the electronic processor is further configured to display information based on the charge level of at least one of the plurality of electrical devices within a range of the first charging coil.

9. A method of charging multiple electrical devices, the method comprising:

determining a charge level of an electrical device of a plurality of electrical devices when the electrical device is positioned within a charging section of a platform configured to receive the plurality of electrical devices and to move relative to a center member, the center member including a first charging coil positioned within the center member, the first charging coil configured to charge the electrical device of the plurality of electrical devices when the electrical device is positioned within the charging section;

determining when the charge level of the electrical device exceeds a predetermined charge threshold when the electrical device is positioned within the charging section; and positioning, when the charge level of the electrical device exceeds the predetermined charge threshold, at least one other electrical device of the plurality of electrical devices within the charging section and moving the electrical device out of the charging section by rotating the platform relative to the center member.

10. The method of claim 9, wherein the at least one other electrical device is selected from the plurality of electrical devices based on whether the at least one other electrical device is located directly adjacent to the electrical device, a charge level of the at least one other electrical device, a user input, and a manual force exerted on the platform causing the platform to move relative to the charging section.

11. The method of claim 9 further comprising:

positioning an electrical device of a second plurality of electrical devices within a second charging section of a second platform and charging the electrical device of the second plurality of electrical devices using the first charging coil wherein the second platform is configured to move relative to the center member and to receive the second plurality of electrical devices.

12. The method of claim 9 further comprising:

positioning an electrical device of a second plurality of electrical devices within a second charging section of a second platform and charging the electrical device of the second plurality of electrical devices using a second charging coil wherein the second platform is configured to move relative to the center member and to receive the second plurality of electrical devices.

13. The method of claim 9 further comprising:

positioning an electrical device of a second plurality of electrical devices within a second charging section when each electrical device of the plurality of electrical devices exceeds the predetermined threshold.

14. The method of claim 9, wherein the platform further includes a second charging section and the center member includes a second charging coil positioned at or within the center member and the method further comprising:

charging the at least one other electrical device of the plurality of electrical devices when the at least one other electrical device of the plurality of the electrical devices is positioned within the second charging section.

15. The method of claim 9 further comprising:

displaying, on a display, information based on the charge level of at least one of the plurality of electrical devices within a range of the first charging coil.

16. A charger comprising:

a housing including a wireless charging coil positioned within a center member, the wireless charging coil configured to wirelessly charge an electrical device when the electrical device is positioned within a range of the wireless charging coil;

an electronic processor configured to determine when the charge level of the electrical device exceeds a predetermined charge threshold when the electrical device is positioned within the range of the wireless charging coil; and at least one moveable platform coupled to the housing, the at least one moveable platform configured to receive a plurality of electrical devices to be charged, the at least one moveable platform configured to move at least one of the plurality of electrical devices within the range of the wireless charging coil for wirelessly charging the at least one of the plurality of electrical devices when a charge level of the at least one of the plurality of electrical devices exceeds a predetermined charge threshold by rotating relative to the center member.

17. The charger of claim 1, wherein each of the multiple electronic devices is a portable electronic device.

18. The method of claim 9, wherein each of the multiple electronic devices is a portable electronic device.

\* \* \* \* \*